United States Patent [19]
Lovell

[11] 4,452,856
[45] Jun. 5, 1984

[54] CORROSION PROTECTION PRODUCT, METHOD AND STRUCTURE

[76] Inventor: Roger Lovell, P.O. Box 760, Palacios, Tex. 77465

[21] Appl. No.: 218,082

[22] Filed: Dec. 19, 1980

Related U.S. Application Data

[63] Continuation-in-part of Ser. No. 000,587, Jan. 2, 1979, Pat. No. 4,275,111, which is a continuation-in-part of Ser. No. 783,467, Mar. 31, 1977, abandoned.

[51] Int. Cl.³ .................... B32B 3/26

[52] U.S. Cl. .................... 428/312.8; 428/317.9; 428/319.3; 428/321.1

[58] Field of Search .................... 106/14.33; 427/418, 427/247, 409, 419.3, 419.5; 428/321, 467, 309, 312.8, 317.9, 319.3, 321.1; 252/25

[56] References Cited

U.S. PATENT DOCUMENTS

| | | | |
|---|---|---|---|
| 187,559 | 2/1877 | Richardson | 427/292 |
| 663,281 | 12/1900 | Kopp | 427/418 |
| 1,159,748 | 11/1915 | Comstock | 427/418 |
| 1,638,342 | 8/1927 | Kessler | 427/417 X |
| 1,834,746 | 12/1931 | Short | 428/613 |
| 2,195,669 | 4/1940 | Cavanaugh | 252/25 |
| 2,288,633 | 7/1942 | Luckhaupt | 428/321 |
| 2,796,363 | 6/1957 | Lalone | 427/421 X |

OTHER PUBLICATIONS

Jameson, Lewis, *Manufacturers' Practical Recipes,* vol. I, London, England, Lewis Jameson and Co., 1902, pp. 248–249.

Hawley, G. G., *The Condensed Chemical Dictionary,* New York, Van Nostrand Reinhold Company, 1977, pp. 506, 515, 535.

Hawley, G. G., *The Condensed Chemical Dictionary,* Ninth Edition, New York, van Nostrand Reinhold Company, 1977, p. 508.

*Primary Examiner*—Evan K. Lawrence
*Attorney, Agent, or Firm*—Whann & Gabriel

[57] ABSTRACT

A corrosion protection structure for protecting an outer covering on a porous metal body from corrosive undermining. The corrosion protection structure includes an inner protective material within the pores of a metal body having an outer surface, pores communicating with the outer surface, and a covering of solid outer protective material that is bonded to the outer surface and bridges over the pores. The inner protective material is a liquid medium, preferably oil, which is substantially impervious to atmospheric corrosive agents, having therein a suspension of finely divided particulate material, preferably paint pigment. Some of the finely divided particulate material substantially seals off small inner channel portions of the pores and thereby stabilizes the location of the inner protective material in the pores, both pending the application of the outer covering to form the structure and after the application of the outer covering over a long operational life of the resulting corrosion protection structure, so that the inner protective material is properly located for optimum protection of the outer covering from corrosive undermining.

22 Claims, 9 Drawing Figures

CORROSION PROTECTION PRODUCT, METHOD AND STRUCTURE

RELATED APPLICATIONS

This is a continuation-in-part of my co-pending application Ser. No. 000,587, filed Jan. 2, 1979, U.S. Pat. No. 4,275,111, for CORROSION PROTECTION STRUCTURE; which was, in turn, a continuation-in-part of my application Ser. No. 783,467, filed Mar. 31, 1977 for CORROSION PREVENTION METHOD, now abandoned.

BACKGROUND OF THE INVENTION

1. Field of the Invention

The present invention is in the field of protective coatings for structures made of corrodible metal, and the invention relates more particularly to improving the corrosion resistance of metal structures that are covered by outer protective coatings such as resin coatings, including resin coatings reinforced with glass or other filler materials, employed for the protection of corrodible metal structures.

2. Description of the Prior Art

Despite the present advanced state of technology in the plastics industry, and the current widespread availability and use of a variety of resin protective coatings, including resin coatings that are reinforced with glass or other filler materials, the protection of metal bodies against corrosion remains a major industrial problem, and the worldwide expenditure in combating and replacing losses due to corrosion is currently one of the world's greatest economic losses. Many modern resin coatings will intrinsically provide an excellent barrier against various corrosive agents, including such atmospheric corrosive agents as oxygen, water vapor and carbon dioxide, as well as various man-generated atmospheric pollutants, and even against the severe corrosive agents of a marine environment such as those found in salt water. Nevertheless, even the best resin protective coatings, when applied according to current technology to large structures with extensive areas which are likely to be subjected to a severely corrosive environment, such as a marine environment, will not satisfactorily protect such structures from corrosion due to attack by both oxidation and electrolytic action. Examples of such large structures which are not adequately protectable by modern resin coatings applied according to current procedures and which therefore present a continuous problem of deterioration by corrosion when subjected to a highly corrosive environment such as a marine environment, are ship or boat hulls, offshore drilling or production platforms, bridges, pipelines, and the like. Examples of some other metal structures which involve corrosion problems on a very large scale although they are not necessarily subjected to a marine environment, are metal building structural members and panels, cargo shipping containers used on ships, trains, trucks and aircraft, the bodies or shells of various vehicles such as automobiles, trucks, buses, trains, aircraft and the like, and a variety of materials storage containers.

As an example of the severity of this corrosion problem in a marine environment, the present life expectancy of aluminum ship hulls in salt water is only approximately seven to ten years, even with attempts to protect them from corrosion by the use of the most modern resin coatings.

The conventional procedure for appying a resin protective coating, which may or may not be reinforced with glass or other filler material, onto a metal structure, is to first clean the structure, which may be done by sandblasting, and then to directly apply the resin coating over the cleaned structure. The nature of such resins is that they are characteristically too viscous to substantially penetrate into the pores of the metal surface, and hence are unable to displace moist air or other corrosive agents therefrom. Corrosive agents are therefore inevitably encapsulated in the pores underneath the coating and are free to immediately initiate and perpetuate corrosion from underneath the resin coating. All such entrapped air has a water vapor content, and substantial temperature reductions will cause at least a portion of such water vapor to precipitate as liquid water in the pores. Such moisture, in combination with carbon dioxide and other corrosive agents likely to be present in the air, are free to attack the edges of the interface between the outer surface of the metal and the resin covering at the pores, thereby undermining the bond between the resin covering and the metal surface, and this will occur no matter how well or by what means the outer surface of the metal structure was cleaned. It has historically been a matter of primary concern in the application of resin coatings to metal structures that the structures be entirely free of oil prior to application of the coating.

Such corrosive undermining of conventionally applied resin coatings on metal structures will proceed to occur from the time the coating was applied, at a rate that will depend upon the nature and extent of the corrosive agents captured within the pores, and this will ultimately result in blistering, separation and cracking of the resin coating. The corrosive undermining will be accelerated in areas underneath the resin coating adjacent any regions where the resin has been scratched away to expose bare metal to the environment.

One method that has heretofore been successfully employed to protect resin-coated metal objects from such corrosive undermining has been vacuum impregnation of the pores with resin. However, this method is only applicable to very small metal parts which are capable of being enclosed in a vacuum chamber to which high vacuum may be applied, and the method is not applicable to large metal structures having extended surface areas. Also, this vacuum impregnation method is critical in application, and is slow, time-consuming and expensive.

As indicated above, conventional practice in the application of resin coatings to metal objects requires that the objects be absolutely free of oil, and if it was thought that any oil might be present on the object, such oil was required to be completely removed, generally by chemical means, prior to application of the resin coating. Thus, any suggestion that oil might deliberately be applied to a metal structure as a preparatory step prior to the application of a resin coating would be diametrically opposed to conventional thinking and practice. In fact, the prior art specifically teaches the provision of an oil undercoat for the purpose of preventing a resin outer coating from bonding to metal objects; i.e., the prior art teaches that oil prevents a resin coating from bonding to a metal body. Thus, U.S. Pat. No. 3,084,066 to Dunmire teaches that chain links for marine use be provided with a full oil undercoating beneath a resin covering to prevent adherence of the resin covering to the metal and to provide lubrication for minimizing wear of adjacent links against each other. Retention of the outer resin coating on the objects is only permitted by the specialized nature and small size of the chain links, which enables the outer covering to encapsulate both the oil film and the individual links in a closed loop configuration. Similarly, in U.S. Pat. No. 3,443,982 to Kjellmark, Jr., individual wire strands for an oil well sucker rod each have a full oil-based undercoat with a tubular resin outer jacket that is supported by closed loop encapsulation of the oil around the narrow wire.

An early attempt to utilize oil under an outer coating was disclosed in U.S. Pat. No. 663,381 to Kopp, wherein a metal surface was first completely covered with coal oil, and then immediately an oil base paint was applied over the oil, so that ". . . the oil combines with part of the paint and carries it into the interstices and the paint and oil tend to unite, securing a close adhesion to the surface." This combination of oil and oil-based paint had several inherent defects which rendered it generally ineffective for protection against moisture and other corrosive agents. First, since the oil assertedly became combined with the paint, and had to be combined in order to effect any bond of the paint to the metal after the metal surface was "completely and fully" covered with the oil, then the oil simply became a part of the oil base paint. This resulted in a partial thinning of the paint which lessened its effectiveness in bonding and drying, while nevertheless leaving the paint with the inherent defect, now well recognized in the art, that when it did dry, evaporation of solvents therefrom left it porous and pervious to corrosive agents of the atmosphere and marine environments. A further defect of the Kopp oil and paint combination was that upon drying, the paint that had been carried into the interstices or pores suffered the usual shrinkage of drying paint, which caused the paint within the interstices or pores to pull away from the walls, the resulting spaces applying a pressure differential across the porous paint layer to draw air and its corrosive agents into these spaces through the pores in the paint. In this manner, from the time the paint commenced to dry, moisture and other corrosive agents of the atmosphere were drawn into the pores and free to initiate corrosive undermining of the paint covering.

It is notable that all three of the prior art patents referred to above which taught the application of oil prior to an outer coating prescribed that the oil should completely cover the surface of the metal under the outer coating. There was no teaching or suggestion in this prior art that only restricted, selected portions of the metal might be provided with oil under an outer coating, or that there might be any benefit in such an arrangement, or how such might be effected. In particular, the prior art did not teach or suggest that inner surfaces only of the metal, within the pores, be covered with a first protective or sealing material such as oil which is excluded from the outer surface, and that the outer surface only of the metal be bonded with a second protective or sealing material such as resin in a continuous covering that also bridges over the pores and the said first material. Nor was there any teaching or suggestion in the prior art as to how surface oil might be completely removed from an oil covered and impregnated metal surface so as to admit of an intimate bond with an outer resin coating, while nevertheless leaving the pores of the metal substantially completely filled with oil in the regions of the pore orifices where the oil could seal and protect the otherwise exposed and vulnerable edges of the interface between the metal surface and the outer coating.

SUMMARY OF THE INVENTION

In view of these and other problems in the art, it is a general object of the present invention to provide a novel corrosion protection structure which affords greatly increased corrosion protection characteristics to metal bodies as compared to the corrosion protection that is provided by conventional coatings applied according to conventional procedures.

Another object of the present invention is to provide a novel corrosion protection structure which has particular utility in the preservation of large metal structures, which may be composed of steel, aluminum, or any other corrodible metal, that are to be subjected to a severely corrosive environment such as a marine environment, as for example ship or boat hulls, offshore drilling or production platforms, bridges, pipelines or the like; and which also finds particular utility in the protection of various other large metal structures which involve corrosion problems on a very large scale such as metal building structural members and panels, cargo shipping containers used on ships, trains, trucks and aircraft, the bodies or shells of various vehicles such as automobiles, trucks, buses, trains, aircraft and the like, and a variety of materials storage containers.

Another general object of the present invention is to greatly increase the durability and effectiveness of modern resin coatings against corrosion, particularly in highly corrosive environments such as a salt water marine environment, while nevertheless enabling current technology and production facilities to be utilized for the manufacture of resin polymer coatings such as polyester, epoxy and other resin coatings which may be reinforced with various filler materials.

A further object of the present invention is to greatly reduce electrolytic activity and other causes of oxidation associated with ship hulls, offshore platforms and other structures that are subjected to severely corrosive environments such as a seawater environment. A metal ship hull or offshore platform will function as an anode in seawater, which has high electrolyte content, and current practice is to employ substitute anodes such as zinc anodes at various positions below the waterline. Such substitute anodes reduce but cannot completely eliminate electrolytic deterioration of boat hulls, offshore platforms and the like. The present invention has been found to be so highly effective against electrolytic corrosion that such zinc anodes appear completely unused, and are even coated with algae, after more than two years of testing in seawater in connection with an aluminum boat hull protected by the present invention; whereas similar anodes associated with a conventionally protected aluminum hull would be bright in color and visibly eaten away even after only a few days of seawater use.

A further object of the invention is to provide a novel structure for protecting metal bodies from corrosion, wherein a resin outer covering is intimately bonded to outer surface means of the metal body in a strong and permanent bond, and wherein the usual problem of corrosive deterioration initiating from pore means of the metal body underneath the outer covering is prevented from occurring by embodying an inner protective or sealing material, preferably oil, within the pore means, the inner protective or sealing material being bridged over and encapsulated in the pore means by the outer resin covering.

Yet another object of the present invention is to provide a novel corrosion protection structure of the character described which will not only protect metal structures from corrosion in unabraded areas for a prolonged operational life, even under highly corrosive conditions, but which will also afford protection adjacent to abraded or scratched regions, preventing corrosion from spreading from such abraded or scratched regions to other areas of the metal surface under the protective structure.

Another object of the invention is to provide a novel corrosion protection structure of the character described which, when applied to only a portion of the surface area of a large metal structure exposed to a highly corrosive environment, so greatly reduces or substantially eliminates overall electrolytic activity in the structure as to afford excellent protection against corrosion even in untreated portions of the structure. Thus, in the aforesaid testing of the present invention for more than two years in seawater in connection with an aluminum boat hull, one outside region of the hull below the waterline was deliberately left uncoated for test purposes, and other outside regions of the hull below the waterline had the outer coating scraped off down to the bare metal during operations of the boat. Yet these uncoated and bare regions of the hull surprisingly only sustained an estimated less than one-tenth of the normally expected corrosion for the time of exposure. Even more surprising, the entire inner surface of this hull was given only a minimal covering of conventional paint prior to the beginning of the testing, and no evidence of any corrosive activity on the inside of the hull was observable after the more than two years of testing.

Another object of the invention is to provide a corrosion protection structure of the character described which is inexpensive and easy to apply even to very large metal surface areas, which does not involve use of any environmentally harmful materials, and which is reliable in operation.

In accordance with the present invention, the corrosion protection structure is applied to a metal body having a clean outer surface that is substantially completely free of contaminants, and particularly of oil, and having inner surfaces defining a multiplicity of pores which communicate with said outer surface at respective pore orifices. An inner protective or sealing material, preferably oil, which is generally impervious to corrosive agents of the atmosphere and of marine environments, is disposed within the pores of the metal body so as to substantially completely fill at least the outer regions of the pores proximate the pore orifices. An uninterrupted covering of outer protective or sealing material extends over both the outer metal surface and the pores, being intimately bonded to substantially the entire outer metal surface and bridging across the pore orifices so as to encapsulate the said inner protective or sealing material such as oil in the pores. The said outer protective or sealing material is preferably a polymerized resin which is also generally impervious to atmospheric and marine corrosive agents, and which further is generally unmixable with and impervious to the said inner protective or sealing material such as oil so that the outer covering material or its bond to the metal will not be deteriorated by the inner protective material, and so that the inner protective material will be permanently sealed or encapsulated in its operative position in the pores. Preferably, an uninterrupted web or plug of the inner protective or sealing material extends across the pores proximate the pore orifices in a direct interfacing relationship with the bridging portions of the outer covering, this web or plug of the inner protective material serving to seal the interface between the outer covering and the outer metal surface in the region of the pore orifices from any corrosive agents that may inadvertently have become entrapped in the pores, as in bubbles, thus assuring the outer covering against corrosive undermining starting from the pores.

A preferred inner protective or sealing material product used in the structure of the invention assures that the web or plug of the inner protective or sealing material directly interfaces with the bridging portions of the outer covering and seals the critical interface between the outer covering and the outer metal surface in the region of the pore orifices, both at the time the outer coating is applied and over a long working life of the metal body. This inner protective or sealing material product comprises a liquid medium, preferably oil, that is substantially impervious to atmospheric corrosive agents, and has therein a suspension of finely divided particulate material. One or more particles of the particulate material are wedged into and seal off small inner channel portions of the pores from inward flow of the liquid medium away from its operative interfacing location proximate the pore orifices, while at the same time providing a barrier over a long operative life against movement of any air bubbles entrapped in the small inner channel portions outwardly toward the critical interface.

According to the method of forming the structure of the present invention, if the pore orifices of the metal body to be protected are initially somewhat constricted from mill rolling or other mill processing, or from contamination such as mill scale or bloom, oxide, old paint or the like, then an initial preparation step is preferably employed to remove such constrictions or obstructions and open out the pore orifices so as to optimize absorption into the pores of the inner protective or sealing material such as oil which is next to be applied. Such initial preparation step, if required, is preferably accomplished by particle-blasting the metal body with particulate material preferably of a type wherein the individual particles have points or corners thereon, such as natural or artificial sand, which opens up and rounds off the pore orifices in a reaming or honing action.

The inner protective or sealing material, preferably oil, is then applied in liquid state over the outer surface and pore orifices of the metal body, and allowed to remain on the metal body for a sufficient interval of time to assure deep impregnation of the pores, the inner protective or sealing material such as oil displacing from the main outer portions of the pores which communicate with the pore orifices substantially all corrosive agents that were previously therein. The inner protective or sealing material such as oil is preferably applied by means of an airless spray gun which provides a mist under pressure that is directed generally normal to the metal surface so as to drive the oil or other inner material into the pores and thereby improve penetration deep into the pores.

According to the preferred method of forming the structure of the invention, the inner protective or sealing material such as oil is provided as a liquid medium with a substantially uniformly dispersed suspension of finely divided particulate material therein, the particles of which have the characteristics: (1) of being much smaller than the main outer portions of the pores proximate the pore orifices, so as to allow unimpeded flow of the liquid medium and suspended particles deep into the pores; (2) of being more dense than the liquid medium, preferably with a specific gravity of at least about four times that of the liquid medium, so that during the aforesaid application of the liquid medium when the liquid medium is slowed down by constrictions deep within the pores inertia of the heavier particles will tend to keep them moving inwardly and they will tend to accumulate proximate such constrictions and thereby commence plugging and sealing off small inner channel portions of the pores beyond such constrictions, and also so that the particles will be further driven into such plugging positions in the next step of the method; and (3) of being substantially insoluble in the liquid medium so as to continue plugging and sealing off said small inner channel portions of the pores and any air that may have become entrapped therein pending application of the outer coating and over a long working life of the treated metal structure.

After the pores of the metal body have thus been impregnated with the inner protective or sealing material such as oil having the suspension of finely divided particulate material therein, an outer surface treating and particle impelling step is applied which comprises simultaneously (1) selectively removing all of the inner protective or sealing material such as oil that might remain after the impregnation step from the outer surface of the metal body, so as to prepare the outer metal surface for intimate bonding with the outer covering that is to be applied; (2) selectively retaining the impregnation of inner protective or sealing material within the pores; and (3) forcefully impacting and impelling particles of the suspended particulate material inwardly through the pores so as to wedge one or more of the accumulating particles in said pore constrictions and complete the plugging and sealing off of the small channel portions of the pores beyond the constrictions.

This outer surface treating and particle impelling step is preferably accomplished by particle-blasting the outer surface of the metal body with particulate material that is graded so that the individual particles are larger than the pore orifices whereby they will not substantially displace the inner protective or sealing material from the pores; this particle-blasting step preferably being with a material such as natural or artificial sand having individual points or corners that not only thoroughly clean the outer metal surface but also produce a new outer metal surface of irregular, roughened, generally toothed texture which may be considered to be a mechanically etched surface.

The particle blasting involves high velocity movement, and hence considerable kinetic energy, of the blasted particles in a direction generally normal to the metal surface. Some of this kinetic energy is imparted to the suspended particulate material in the regions of the pore orifices so as to drive some of the suspended particles into the aforesaid plugging positions in constricted inner portions of the pores. As the plugging particles are accumulating in pore constrictions during the application of the liquid medium and during the succeeding particle-blasting, any entrapped air bubbles will be enabled by their extremely low viscosity to filter through the accumulating particles, leaving substantially uninterrupted bodies of the liquid medium between the completed plugs of finely divided particulate material and the pore orifices.

During this particle-blasting, when the small inner channel portions have become plugged or stoppered, further inward movement of the liquid medium into the pores stops, which minimizes inward dishing or cupping of the liquid surfaces at the pore orifices. The particle plugs similarly prevent inward travel of the liquid medium by capillary action, and consequent inward dishing or cupping, during the interval of time between the blasting and application of the outer covering. Thus, the location of the liquid medium proximate the pore orifices is stabilized prior to and during application of the outer coating to eliminate entrapment of air immediately underneath the outer covering. At the same time, sealing off of the small inner channel portions of the pores maintains the effectiveness of atmospheric pressure on the surfaces of the liquid medium proximate the pore orifices to retard the liquid medium from leaking out of the pores onto the outer surface, thus providing an extended interval of time after the surface treating step during which the outer covering may be applied without its bonding to the outer surface being adversely affected by the presence of the liquid medium on the outer surface.

The wedged plugs or seals of the finely divided particles also extend the duration of the protection against corrosive undermining that is provided by the invention, by preventing any air bubbles and contained corrosives that may have become entrapped deep within the pores from moving out, under the influence of working movements of the metal, into contact with the interface between the metal surface and the outer covering at pore orifices, over a long operational life of the metal body.

The final process step in forming the structure of the invention is application of the uninterrupted covering of outer protective or sealing material, preferably resin which is polymerized in place, the outer covering intimately bonding to the outer metal surface and bridging across the pore orifices so as to encapsulate the bodies of inner protective or sealing material such as oil.

BRIEF DESCRIPTION OF THE DRAWINGS

These and other objects of the invention will become more apparent in reference to the following description and the accompanying drawings, wherein.

DETAILED DESCRIPTION

Figure 1:
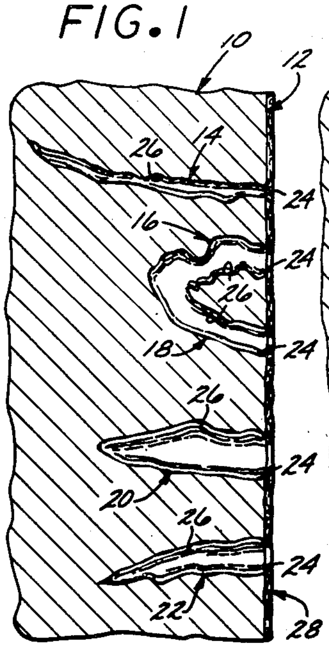
FIG. 1 is a greatly enlarged fragmentary sectional view illustrating a typical microporous metal surface configuration of a metal body to which the present invention is to be applied.

Referring to the drawings, FIG. 1 illustrates a metal body 10 to which the present corrosion protection structure is to be applied, but in its conventional form prior to the application of the present invention. Typically, the metal body 10 will be composed of steel or aluminum, although it may be of any other corrodible metal, and generally but not necessarily, metal body 10 to which the present invention will be applied is part of a large structure having an extensive surface area, and which is to be subjected to a severely corrosive environment such as a marine environment, as for example a ship or boat hull, an offshore drilling or production platform, a bridge, a pipeline, or the like. Examples of some other metal structures which involve corrosion problems on a very large scale and which are therefore desirable subjects for application of the present invention are metal building structural members and panels, cargo shipping containers used on ships, trains, trucks and aircraft, the bodies or shells of various vehicles such as automobiles, trucks, buses, trains, aircraft and the like, and various materials storage containers.

The greatly enlarged illustration of FIG. 1 shows a typical microporous metal surface configuration to which the present invention will be applied, the metal body 10 having a generally flat outer surface 12 that is interrupted by a multiplicity of minute, generally microscopic pores such as the pores 14, 16, 18, 20 and 22 that are illustrated. As used herein, the term "pores" refers to the minute openings, interstices, or other irregularities in which liquid may be absorbed that are characteristically found in the surface of metal bodies. Each of the pores 14, 16, 18, 20 and 22 has an orifice 24 where it opens at the outer surface 12 of metal body 10. The pores 14, 16, 18, 20 and 22 are defined by inner pore surfaces 26 which may have small quantities of oxide or other contaminants thereon that are encapsulated and rendered generally ineffective as corrosive agents by the present invention.

Figure 3:
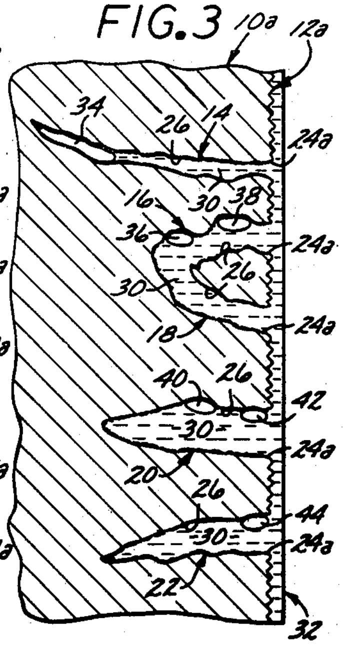
FIG. 3 is a view similar to FIGS. 1 and 2 showing the metal body after inner protective or sealing material such as oil has been applied thereto and allowed to impregnate the pores.

As indicated in FIG. 1, the pore orifices 24 may initially be somewhat constricted from mill rolling or other mill processing, and even new metal as received directly from the mill may have significant amounts of surface contamination 28 such as mill scale or bloom, or oxide. Surface contamination 28 of a metal body 10 to which the present invention is to be applied may also include old paint or other partly deteriorated covering material. As seen in FIG. 1, such surface contamination 28 may further restrict the pore orifices 24, and in some instances may even completely close off pore orifices. Any such constrictions of the pore orifices resulting from mill processing, surface contamination, or other cause, will tend to obstruct the free flow of inner protective or sealing material such as oil into the pores during the method step of the invention that is illustrated in FIG. 3. Accordingly, if any substantial such constriction or obstruction of the pore orifices 24 exists in the initial condition of the metal body 10, then an initial preparation step is preferably employed in the method or process phase of the invention to remove such constrictions or obstructions and open out the pore orifices so as to optimize absorption into the pores of the inner protective or sealing material such as oil which is applied in the method or process step shown in FIG. 3.

The presently preferred method for opening up constricted or obstructed pore orifices 24 is to particle-blast the metal body 10 with particulate material preferably of a type wherein the individual particles have a plurality of points or corners, such as natural or artificial sand. Blasting with No. 3 size sand particles or equivalent artificial sand particles has been found to satisfactorily remove scale and oxide obstructions from the pore orifices, as well as to open up pore orifice constrictions and make the edges of the pore orifices generally rounded so as to expose the pores for rapid and substantially complete absorption therein of the inner protective or sealing material such as oil. It can be determined that the particle-blasting has been applied to a sufficient extent to properly clear and open the pore orifices when the outer surface of the metal body 10 has been cleaned by the particle-blasting to a bright, generally white appearance. This initial particle-blasting step serves the further function of blowing moisture and other corrosive agents out of the opened pores, facilitating displacement of any remaining corrosive agents by the oil or other inner protective or sealing material that is about to be applied. In order to minimize moisture in the pores after this initial particle-blasting step, the step is preferably performed in dry weather and during the daytime, when the humidity is relatively low.

The satisfactory use of No. 3 size particles referred to above was in the initial preparation of steel and aluminum sheet materials of the types employed in boat hulls. The No. 3 size particles properly cleared and opened up the pore orifices without undesirable pitting of the metal surfaces. It is to be understood that finer particulate matter may be used for the particle-blasting of softer metals; while larger particulate matter may be employed provided the metals are sufficiently hard to avoid undesirable pitting.

Figure 2:
FIG. 2 is a view similar to FIG. 1, showing the metal body after an initial preparation step, preferably particle-blasting, has been applied to open out the pore orifices and remove surface contamination.

FIG. 2 illustrates the general condition of the metal body 10 after the application of the initial preparation step of particle-blasting, the metal body now being designated 10*a*. All of the external surface contamination layer 28 has been removed from the outer surface 12 of metal body 10, and the prepared metal body 10*a* now has a new outer surface 12*a* which is clean and as a result of impingement of the points or corners of the blasted particles has a roughened, toothed texture that is bright and gennerally white in appearance. The pore orifices 24*a* have been cleared of scale, oxide, paint or other contaminants, and constrictions or sharp corners from mill operations have been opened and rounded off by a reaming or honing action of the points or corners of the particles employed in the particle-blasting. The opened, rounded pore orifices 24*a* so readily conduct liquid into the pores that when oil is applied to the initially prepared metal body 10*a* as the inner protective or sealing material of the present invention, the metal body 10*a* appears to soak up the oil much like a sponge. A further important feature of the open pore orifices 24*a* is that during the application of the inner protective or sealing material such as oil as illustrated in FIG. 3, and particularly when later the oil is removed from the surface of the metal body and the surface is prepared to receive the outer protective or sealing material, which is the condition of the metal body illustrated in FIG. 4, any air bubbles that may be present in the oil-filled pores proximate the orifices will not tend to remain entrapped proximate the pore orifices, but will be readily displaced by the oil and thereby ejected out of the open orifices.

FIG. 3 illustrates the initially prepared metal body 10*a* after application of the inner protective or sealing material. The inner protective or sealing material such as oil is applied as soon as is practical after the aforesaid initial particle-blasting step, and preferably before any substantial increase in ambient humidity might tend to introduce moisture into the pores. Should moisture inadvertently get into the pores of the metal after the initial particle-blasting step but before the application of the inner protective or sealing material such as oil, as for example from rain or condensation from being left overnight, then it is desirable to perform the initial particle-blasting step again, or to at least apply an initial blast of clean, dry air, so as to drive such moisture out of the pores before proceeding with the application of the inner protective or sealing material such as oil.

The inner protective or sealing material is applied in liquid state and is selected to have a sufficiently low viscosity at the time of application to the metal body 10*a* that it will readily wet the inner pore surfaces 26 and deeply impregnate the pores, preferably to the extent that the pores are substantially filled with the inner protective or sealing material. Despite the objective of substantially completely filling the pores with the inner protective or sealing material, it is understood that some atmospheric bubbles may nevertheless inadvertently become entrapped within some of the pores, depending upon the configurations and orientations of the individual pores. Thus, for illustrative purposes, in FIG. 3 it has been assumed that a bubble 34 has been entrapped in the very thin, deep root portion of the long, thin pore 14; a pair of bubbles 36 and 38 have been entrapped behind overhangs within the upper of the two pores 16 and 18 which communicate at their roots; a bubble 40 has been entrapped deeply within pore 20, and bubbles 42 and 44 have been captured near the orifices 24 of respective pores 20 and 22.

It is also understood that many pores have main outer portions which readily become filled with the inner protective or sealing material, but also have small inner channel portions that do not readily become filled with the inner protective or sealing material but instead tend to retain air and associated corrosives therein. The form of the invention illustrated in FIGS. 6–9 and described in detail hereinafter enables such small inner channel portions to be isolated from the main outer portions of the channels for improved application of the outer coating and added durability of the system.

As seen in FIG. 3, the inner protective or sealing material is applied over the entire surface region of the metal body 10*a*, including both the outer surface 12*a* and the pore orifices 24*a*, so as to assure maximum penetration of the inner protective or sealing material into the pores. This application is preferably by means of an airless spray gun which provides a mist under pressure that is directed generally normal to the metal surface so as to drive the inner protective or sealing material into the pores, improving the depth of penetration into the pores. This will result in the pores 14, 16, 18, 20 and 22 each being substantially completely filled with bodies 30 of inner protective or sealing material, with an outer film 32 of the inner protective or sealing material extending over both the outer surface 12*a* of the metal body 10*a* and over the pore orifices 24*a*. This excess of the inner protective or sealing material when it is applied assures an adequate supply of the inner protective or sealing material during the interval of time that it is allowed to remain on the metal body 10*a* as in FIG. 3 for maximum penetration of the inner protective or sealing material into the pores. When the inner protective or sealing material thus impregnates the pores, it displaces from the pores substantially all corrosive agents that were previously in the pores, including such atmospheric corrosive agents as oxygen, water vapor and carbon dioxide, as well as various man-generated atmospheric pollutants; and if the metal body 10*a* is proximate a marine environment, such marine corrosive agents as water, and particularly sea water with its considerable electrolytic content. Any such corrosive agents that may inadvertently still remain in the pores will be isolated in bubbles, and any such bubbles will be insulated from the inner pore surfaces 26*a* by a film of the inner protective or sealing material which capillary action will cause to wet substantially the entire inner pore surfaces 26 even in the regions of such bubbles.

Prior to application of the outer surface treating step described below, the inner protective or sealing material such as oil may optionally be driven further into the pores by application of a blast of clean dry air against the outer film 32 of inner material, i.e., toward the outer metal surface 12*a* and pore orifices 24*a*. This blast of air also serves to remove excess inner material such as oil from the outer metal surface 12*a*.

Figure 4:
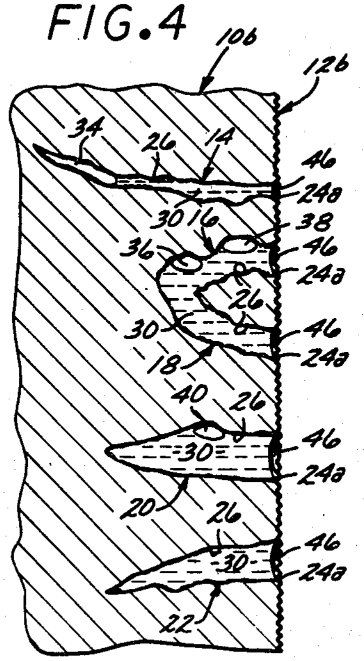
FIG. 4 is a view similar to FIGS. 1–3, showing the metal body after an outer surface treating step, preferably particle-blasting, has been applied to selectively remove oil or other inner protective material that might remain on the outer surface after impregnation of the pores, while at the same time selectively retaining the impregnation of oil or other protective material in the pores and providing a stable concave configuration to the surface of the bodies of impregnated material.

The presently preferred inner protective or sealing material is oil which is selected according to the composition of the metal body 10*a* so that it is thin enough, i.e., of low enough viscosity, to substantially completely impregnate the pores within a reasonable time, e.g., within a period of time ranging from a few seconds to a few hours, and yet have sufficient viscosity so that it will not readily travel or leak out of the pores after the outer film 32 of oil has been removed from the outer surface of the metal body as illustrated in FIG. 4. Thus, the oil must have sufficient viscosity so that after the treating step which produces the clean outer surface of the metal body as shown in FIG. 4, the oil will remain within the pores and not travel or leak out onto the outer surface of the metal body for a period of time sufficient to allow application of the covering of outer protective or sealing material which is shown applied in FIG. 5.

Figure 5:
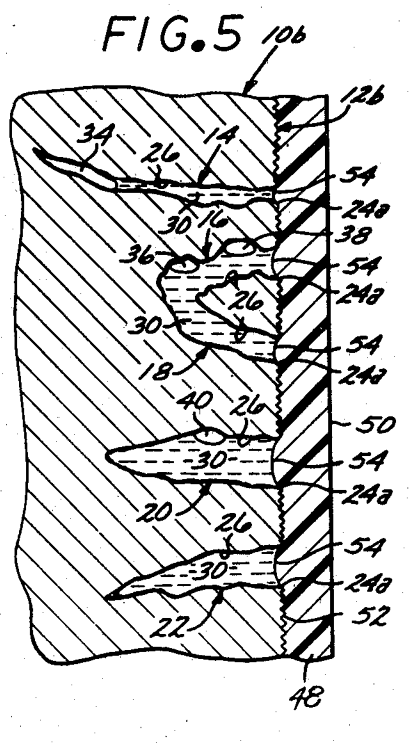
FIG. 5 is a view similar to FIGS. 1–4 illustrating the completed protected metal body after application of the covering of outer protective or sealing material, preferably resin with or without filler.

In accordance with the preferred embodiment of the present invention, when the metal being treated is steel the oil utilized as the inner protective or sealing material can advantageously be a 30 weight motor oil. When the metal being treated is aluminum, which has smaller pores than steel, a less viscous oil, e.g., "3-In-1" brand oil, can be used advantageously as the inner protective or sealing material, the molecules of "3-In-1" oil being considerably smaller than those of 30 weight oil. In both of these examples excellent impregnation of the metal pores will occur within only a few minutes, as for example within above five minutes, although to assure optimum impregnation the oil may be left standing on the metal surface for as long as twelve hours or even longer if convenient. In both of these examples, after the treating step has been applied to remove the outer film 32 of oil and expose the bare metal surface as shown in FIG. 4, it has been found that it is preferable to apply the covering of outer protective or sealing material as shown in FIG. 5 within about four hours after the treating step has been employed to expose the outer metal surface as in FIG. 4, and that best results are obtained if the covering of outer protective or sealing material is applied within about two hours after the treating step has been employed to expose the bare metal surface as in FIG. 4.

It is advantageous in some applications to heat the oil prior to application to facilitate its movement into the pores. Once the oil cools within the pores to ambient temperature it will thicken and, therefore, tend to remain in the pores.

Once the oil and other inner protective or sealing material is thus impregnated into the pores, it is held therein by combined forces of atmospheric pressure and capillary attraction. These holding forces are so strong relative to the force of gravity on the very minute bodies 30 of inner material in the pores that the rate at which the inner material tends to come out of the pores appears to be the same regardless of the orientation of the metal surface being treated, as for example regardless of whether the surface is facing up or down.

After the pores of the metal body 10*a* have thus been impregnated with the inner protective or sealing material such as oil, a treating step is then applied to the metal body 10*a* to prepare the metal body for receiving the covering of outer protective or sealing material. This treating step will be described in connection with FIG. 4, and will sometimes hereinafter be referred to as an outer surface treating step as distinguished from the pore-treating steps heretofore described which included the initial preparation step of clearing the pore orifices described in connection with FIG. 2 and the impregnation step described in connection with FIG. 3. This outer surface treating step comprises selectively removing all of the inner protective or sealing material such as oil that might remain after the impregnation step from the outer surface 12*a* of metal body 10*a*, while at the same time selectively retaining the impregnation of inner protective or sealing material such as oil within the pores. The outer surface treating step preferably includes the production of a new outer surface 12*b* on the metal body 10*b* as shown in FIG. 4, which replaces the previous outer surface 12*a* on the metal body 10*a* of FIG. 3. Such provision of a new outer surface 12*b* assures the complete elimination of inner protective or sealing material such as oil from the outer surface of the metal body, which is a critical factor in obtaining a full and complete intimate bond of the outer covering material with the entire outer surface 12*b*.

The presently preferred technique for applying this outer surface treating step is to particle-blast the outer surface of the metal body with particulate material that is graded so that the individual particles are larger than the orifices of the pores whereby the particles will not enter the pores and displace the oil therefrom to any material extent, but will impinge upon and remove the oil from the entire exposed outer surface of the metal body. Preferably, the particulate material employed in the particle-blasting is a material such as natural or artificial sand wherein the individual particles have points or corners so that the outer surface of the metal body will not only be thoroughly cleaned, but it will constitute a new surface of irregular, roughened, generally toothed texture that provides an enlarged area for intimate bonding of the outer covering material, i.e., a greater bonding area than the area defined by the general plane of the outer surface. A No. 3 natural or artificial sand has been found to operate satisfactorily in the outer surface treating step as applied to steel and aluminum, although it is to be understood that other grades or sizes of particles may be employed, provided the particles are not so small as to materially enter the pores and thereby displace material amounts of the inner protective or sealing material such as oil from the pores, and provided the particles are not so large as to cause excessive pitting of the outer surface of the metal body.

Any fine or particulate material that may inadvertently enter and remain in the pores from either or both of the particle-blasting steps will become encapsulated in the bodies 30 of oil or other inner protective or sealing material, and any such entrapped fine particles of sand are composed of silica, an inert material. Accordingly, the presence of any such fine particulate material in the pores will not tend to diminish the corrosion resistance characteristics of the completed product of the present invention.

The new outer surface 12*b* of metal body 10*b* may be described as a mechanically etched surface. When this outer surface 12*b* has been treated to a required extent to assure that good intimate bonding of the outer covering layer will be achieved, the outer surface 12*b* will be bright and generally white in appearance.

Particle-blasting in the outer surface treating step involves a mechanical treatment that is applied in directions generally normal to the general plane of the surface of the metal body, and this avoids any likelihood of the inner protective or sealing material such as oil being wiped laterally out of the pores back onto the outer surface during the treatment. Slight entry of points of the particles into the pore orifices drives the inner protective or sealing material such as oil still further into the pores, and results in surfaces 46 of the bodies 30 of inner protective or sealing material such as oil which are in the form of a gentle, shallow, concave meniscus extending uninterrupted across the pore orifices and retained in this configuration by an approximate balance between the metal-to-sealing material interface surface tension at the peripheries of surfaces 46 and the sealing material-to-air interface surface tension across the surfaces 46. The aforesaid factors tending to hold the bodies 30 of inner sealing material in place in the pores, together with this concave or inward configuration of the surfaces 46 of bodies 30, and the inherent stability of the meniscuses of such configuration, minimize and retard the tendency for the inner sealing material to leak or travel out of the pores onto the clean new outer surface 12*b*, thereby providing adequate time, as for example from about two to about four hours, after the outer surface treating step during which the outer protective covering may be applied with assurance that there will be full intimate bonding thereof with the entire area of the outer surface 12*b* of metal body 10*b*. The concave curvature of surfaces 46 is also sufficiently shallow to permit full surface interfacing thereof with the more viscous outer covering material when the latter is applied as illustrated in FIG. 5.

An indicator that too much time has lapsed since the outer treating step so that the inner protective or sealing material such as oil has started to leak or travel out of the pores onto the outer surface 12*b* is that the surface 12*b* commences to darken from its previous bright, white appearance. If such occurs, or if the inner material such as oil is left too long before the outer surface treatment is applied and this causes the inner material to leak out of the pores, then in either event the inner material such as oil should be re-applied, and the outer surface treatment applied (again if it had already been applied).

During the outer surface treating step, impingement of some of the particles proximate the pore orifices tends to agitate outer regions of the bodies 30 of inner protective or sealing material such as oil in a manner which will cause the release of any atmospheric bubbles that may have become entrapped near the pore orifices, as for example the bubbles 42 and 44 seen in the respective pores 20 and 22 in FIG. 3, whereby a solid web or plug of the inner protective or sealing material extends across the pores proximate the orifices as seen in FIG. 4. This solid web or plug of the inner sealing material will not only cooperate with the outer layer of sealing material to protect the latter against corrosive undermining in the completed product, but also provides an effective barrier against entry of any corrosive agents into the pores during the interval of time between application of the outer surface treating step illustrated in FIG. 4 and application of the covering of outer protective or sealing material as illustrated in FIG. 5.

Referring now to FIG. 5, the final process step to form the structure of the present invention is application of an uninterrupted covering 48 of outer protective or sealing material which directly interfaces with both the outer metal body surface 12*b* and the surfaces 46 of the bodies 30 of inner protective or sealing material such as oil, but which adheres and bonds only to the outer metal surface 12*b* when a liquid inner protective material such as oil is employed, the covering 48 being wetted by, but not bonded or adhered to, the liquid inner protective or sealing material at the surfaces 46 thereof. The covering 48 of outer protective or sealing material is applied before any material extent of travel or leakage of the inner protective or sealing material such as oil can occur out of the pores onto the outer surface 12*b*, i.e., before the surface 12*b* visibly changes color, darkening from its bright, generally white appearance, for two reasons: (1) so that the outer metal surface 12*b* remains free of the inner protective or sealing material such as oil as a contaminant thereon; and (2) so that the surfaces 46 of the inner protective or sealing material such as oil do not recede to a lowered level in the pores which might interfere with the desired direct interfacing between the covering 48 and the bodies 30 in the pores.

The covering of outer protective or sealing material preferably has a generally smooth outer surface 50. The covering 48 has a direct interface 52 with the entire outer surface 12*b* in the form of an intimate bond therebetween, and the covering 48 bridges over and encapsulates the bodies 30 of inner protective or sealing material such as oil, having direct interfaces 54 with such bodies 30 of inner protective or sealing material.

If the inner protective or sealing material employed has the characteristics which oil has of remaining in liquid form after impregnating the pores, then it is preferred that the material of the outer covering 48 have the characteristic of not being materially combinable or miscible with the liquid inner material such as oil, so that the liquid inner material does not tend to be absorbed out of the pores into the outer covering material, and so that the outer covering material does not tend to become diluted by the liquid inner material and thereby rendered less effective as an outer protective covering. The material of outer covering 48 is also selected so that the covering 48 is generally impervious to, or impermeable by, a liquid inner protective material such as oil, so that the oil will not be dissipated through the covering 48 and the bodies 30 thereof will remain generally full and intact over an extended operational life of the completed product as illustrated in FIG. 5.

The covering 48 of outer protective or sealing material and the inner protective or sealing material such as oil are both selected to be generally impervious or impermeable by corrosive agents of the atmosphere and of marine environments. Thus, the covering 48 of outer protective or sealing material protects its interface 52 with outer metal surface 12*b* against attack from outside atmospheric or marine corrosive agents. Outer covering 48 also protects its interface 54 with bodies 30 of inner protective material against attack from outside atmospheric or marine corrosive agents, and hence bars outside corrosive agents from entering into a location between covering 48 and bodies 30 where they could attack the edges of the interface 52 in the regions of the pore orifices. The inner protective or sealing material, also being generally impervious or impermeable by corrosive agents, seals the interface 52 between outer covering 48 and outer metal surface 12*b* in the region of the pore orifices from any corrosive agents that may inadvertently have become entrapped, as in bubbles, in the pores during the process steps, thus assuring the outer covering 48 against corrosive undermining starting from the pores.

The outer protective or sealing material employed to form the uninterrupted covering 48 shown in FIG. 5, in order to have the required characteristics of being capable of forming an intimate bond to the outer metal surface 12*b*, being impervious to or impenetrable by atmospheric or marine corrosive agents, not being materially combinable or miscible with the inner protective sealing material and also being impervious to or impenetrable by the inner protective or sealing material, is preferably a resin polymer, i.e., a polymerized resin, chosen from many of the commercially available resin and reinforced resin coatings, reinforced with glass or other of the various available filler materials. Some suitable polymerized resins, which are given by way of example only, and not of limitation, include polyester resin, which is currently widely used in boat hulls and protective coatings for marine and other uses, epoxy, polystyrene, polypropylene, polyvinyl chloride, and polyimide.

The outer protective or sealing resin material for covering 48 is preferably a resin which will harden after application without material change in dimension, i.e., without material contraction or expansion. This characteristic is achievable with such a resin covering 48 since the resin solidifies and hardens through polymerization rather than evaporation as with paints. By not materially changing in dimension upon hardening, and in particular by not materially contracting, the resin covering 48 will not as it sets up disadvantageously disturb the dispositions of bodies 30 of inner protective or sealing material in the pores or the interfaces 54 between covering 48 and the bodies 30; and will not tend to break the establishing intimate bond with the outer metal surface **12*b*** as it hardens, or tend to crack and thereby diminish its impermeability to corrosive agents or to the inner protective or sealing material.

In accordance with the present invention, it is preferred that the inner protective or sealing material have the physical characteristic, like oil, or remaining in liquid form after being encapsulated under the outer covering 48. With the inner protective or sealing material remaining in liquid state, thermal expansion and contraction of the metal body **10*b*, of the outer covering 48, or of the bodies 30 of inner protective or sealing material, or relative thermal expansion and contraction between any or all of these, will not tend to cause any separation of the inner protective or sealing material either from the inner pore surfaces 26 or, more importantly, from the interface between the outer covering layer 48 and the outer metal surface 12*b*** proximate the pore orifices.

It will be seen from the foregoing, and from the illustration of FIG. 5, that in accordance with the present invention assurance is achieved against corrosion which might otherwise initiate either from underneath the outer covering 48 or from the outside of covering 48, by coating of substantially the entire surface of the metal body, including both the inner pore surface area which is the summation of the inner pore surfaces 26, and the area of the outer surface **12*b*. Thus, the inner surface area is covered by the inner protective or sealing material, and where such material leaves off, the outer protective or sealing material of the covering 48 commences, these two materials interfacing at the interfaces 54** proximate the pore orifices.

EXAMPLE I

A sample of No. 5153 aluminum was sandblasted with No. 3 sand to bare metal. A coating of "3-In-1" brand oil was applied to the aluminum by use of an airless spray gun to provide a mist under pressure. The oil mist was left on the aluminum for approximately 12 hours, and then most of the oil on the outer surface was removed by a blast of clean, dry air. The outer surface was then treated by sandblasting with No. 3 sand until the outer surface had a bright, white appearance, thus preparing the outer surface of the aluminum to receive the outer covering of protective or sealing material, while retaining oil in the pores. Shortly thereafter a protective coating of "Res-N-Glas" brand glass reinforced resin manufactured by Woolsey Marine Industries, Inc., of Danbury, Conn. 06810, was applied in an uninterrupted covering over the treated aluminum surface, intimately bonding to the treated outer aluminum surface and bridging across the pore orifices and encapsulating the oil retained within the pores. The coating bond to the aluminum was excellent and subsequent tests proved that the completed article had excellent corrosion preventive characteristics.

EXAMPLE II

Two steel spars on a vessel were treated for corrosion prevention and then subjected to salt water environment for approximately three years. The first spar was treated to form the structure of the present invention by a process including the following steps: (a) the spar was sandblasted with No. 3 sand; (b) the spar was completely coated with 30 weight motor oil; (c) the oil-coated spar was treated by sandblasting with No. 3 sand to provide an outer surface substantially free of oil while retaining oil within the pores; (d) a resin coating was applied to the spar; and (e) paint was applied over the resin.

The second spar was treated according to the following process: (a) the spar was sandblasted with No. 3 sand; (b) a resin coating was applied; and (c) paint was applied over the resin.

After approximately three years, the first spar has displayed corrosion only in areas where the resin had been scratched away to expose bare metal to the environment. After continued exposure, the scratched area was found to rust, but the rust did not spread under the adjacent resin coating to other areas of the metal surface.

In less than a year, the second spar became blistered and corroded in numerous places. Not only had the exposed metal at a scratched area rusted, but the rust had spread from that area to areas underneath the adjoining coating.

FIG. 6–9 of the drawings illustrate a modified form of the present invention wherein a novel inner protective product comprising a liquid medium, preferably oil, having a suspension therein of finely divided particulate material provides improvement in both the method of application of the present invention and the resulting corrosion protection structure of the invention.

Figure 6:
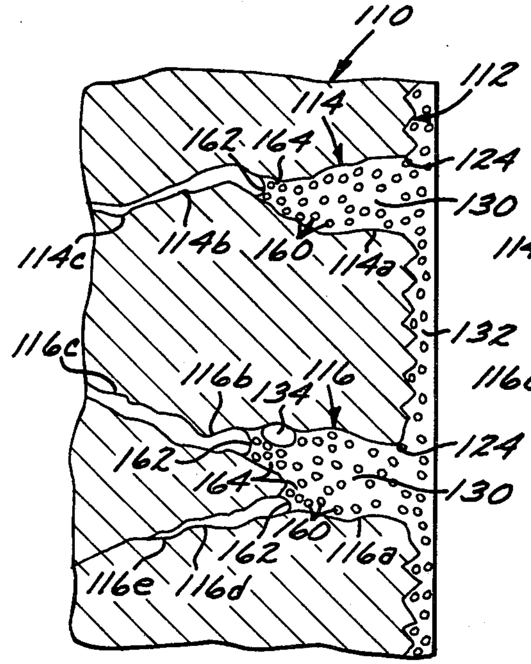
FIG. 6 is an even more greatly enlarged fragmentary sectional view diagrammatically illustrating a metal body at the same stage of the present process as illustrated in FIG. 3, but with the inner protective or sealing material such as oil having dispersed therein a suspension of finely divided particulate material, some of the particles starting to accumulate proximate constrictions deep within pores of the metal.

FIG. 6 illustrates a metal body 110 to which the modified corrosion protection structure and method are being applied, at the same stage in the process as illustrated in FIG. 3. Thus, the initial preparation step of particle blasting described hereinabove in detail in connection with FIG. 2 has already been applied to the metal body 110 shown in FIG. 6; and also the inner protective or sealing material has been applied, preferably by means of an airless spray gun, as described hereinabove in detail in connection with FIG. 3.

Typically, the metal body 110 will be composed of steel or aluminum, although it may be of any other corrodible metal; and generally, but not necessarily, metal body 10 is part of a large structure having an extensive surface area, and which is to be subjected to a severely corrosive environment such as a marine environment.

The illustration of FIG. 6 is even more greatly enlarged than the illustrations of FIGS. 1–5, so as to illustrate, diagrammatically, that many of the individual pores in a typical microporous metal surface configuration to which the present invention will be applied do not simply bottom out near the outer surface of the metal, but continue as small inner channel portions or fissures to a substantial depth within the metal body. With the presence of such pores having deep, narrow roots or fissures in the metal body 10, there is a tendency for several problems to occur which, cumulatively, may interfere with the method steps of the present invention and possibly adversely affect the durability of the completed corrosion protection structure of the invention. These problems arise primarily from the fact that when the inner protective or sealing material such as oil is applied, it can generally only penetrate part way down into the very small inner channel portions or fissures of such pores, which still leaves columns of air entrapped in the roots of the these pores. Since such columns of air are compressible, there is the chance that during the particle-blasting of the outer surface treating step some of the bodies of the inner protective or sealing material such as oil will be driven too far into the pores, thus producing dishing or cupping of the surfaces of the bodies of the inner protective or sealing material such as oil deep enough to enable entrapment of air immediately underneath the outer covering. Similarly, during the interval of time between the particle-blasting of the outer surface treating step and the application of the outer covering, the presence of such air columns in the roots of the pores may enable bodies of the inner protective or sealing material such as oil to shift further into pores by capillary action, either slightly compressing such air columns or displacing air bubbles from such columns, again causing an amount of cupping or dishing at the pore orifices which may enable air to become entrapped immediately underneath the outer covering during its application.

Conversely, air captured in some of these air columns may be at greater than atmospheric pressure because of the inwardly directed impacting of particles against the bodies of inner protective or sealing material during the particle-blasting of the outer surface treating step. This, then, may result in an outwardly biasing pressure differential on some of the bodies of inner protective or sealing material such as oil, which, although opposed by capillary action, may quicken the rate at which such bodies of inner protective or sealing material tend to leak out of the pores, and hence tend to reduce the amount of time that is available for applying the outer covering after the inner protective material has been applied and the outer surface treated so as to receive the outer covering.

The entrapment of such columns of air in channels or fissures deep within pores of the metal may also result in a long-term problem. Thus, over a long working life of the metal body expansion and contraction of the pores caused by both mechanical and thermal working of the metal body may tend to pump the oil deeper into the pores, displacing bubbles of the entrapped air outwardly. Such air bubbles as may reach the interface between the outer surface of the metal body and the outer coating at pore orifices may release moisture and other atmospheric corrosives that could initiate corrosive undermining of the outer coating, thereby tending to reduce the life span of the corrosion protection structure of the present invention.

FIGS. 6–9 of the drawings illustrate how the novel particulated inner protective or sealing material product operates during application of the present coating system and over a long working life of a metal body which has been coated by the present system.

Referring again to FIG. 6, the metal body 110 has outer surface 112 which has a roughened, toothed texture resulting from the initial preparation step of particle-blasting. A multiplicity of pores communicate with outer surface 112, two of which, pores 114 and 116, diagrammatically illustrate the type of pores which tend to cause the above problems to occur, and in which the novel particulated inner protective or sealing material product of the invention operates to cure these problems. The pores 114 and 116 have respective pore orifices 124, the edges of which have been generally rounded by the initial preparation step of particle-blasting to facilitate absorption into the pores 114 and 116 of the inner protective or sealing material. A pore in the surface of a metal body may have one or more communicating root structures. Accordingly, by way of example, the pore 114 has been shown with a single root structure, while the pore 116 has been shown with a divided, double root structure.

Each of the pores 114 and 116 has a respective main outer portion **114*a* and 116*a* which communicates with the respective pore orifice 124. The main outer portion 114*a* of pore 114 extends inwardly from orifice 124 to a constriction 114*b* that leads into a small inner channel portion or fissure 114*c* in the single root of pore 114. The main outer portion 116*a* of pore 116 extends inwardly from orifice 124 and then splits into the divided root structure, one root portion having a constriction 116*b* therein that leads to a first small inner channel portion or fissure 116*c*, and the other root portion having a constriction 116*d* therein that leads to a second small inner channel portion or fissure 116*e***.

At the stage in the application of the present system that is illustrated in FIG. 6, which corresponds to that of FIG. 3, the novel modified inner protective or sealing material product has been applied over the entire surface region of the metal body 110, including both the outer surface 112 and the pore orifices 124. This results in the main outer portions **114*a* and 116*a* of respective pores 114 and 116 being substantially completely filled with respective bodies 130 of the inner protective or sealing material, with an outer film 132 of the inner protective or sealing material extending over both the outer surface 112 and the pore orifices 124 to assure an adequate supply of the inner protective or sealing material during the interval of time that it is allowed to remain on the metal body 110 as in FIG. 6. Application of the modified inner protective or sealing material product is preferably by means of an airless spray gun directed generally normal to the metal surface 112**, not only to provide good depth of penetration into the pores, but also to drive some of the particles of finely divided particulate material suspended in the liquid medium of the modified inner protective or sealing material product inwardly relative to the liquid medium to initiate blocking or sealing off of small inner channel portions of the pores, as described in detail hereinafter.

The bodies 130 of modified inner protective or sealing material comprise a liquid medium having a suspension therein of finely divided particulate material 160. The presently preferred liquid medium is oil which is selected as to type and viscosity in the manner described in detail hereinabove in connection with FIGS. 3 and 4 of the drawings. The finely divided particulate material 160 is preferably substantially uniformly dispersed in the liquid medium at the time of application, although such uniformity of dispersion is altered within the pores during method steps of the invention described in connection with FIGS. 6, 7 and 8, as described in detail hereinafter.

The particles of finely divided particulate material 160 are selected according to the invention to have the following characteristics: (1) They are much smaller than the main outer portions 114*a* and 116*a* of the respective pores 114 and 116 so as to not impede flow of the liquid medium and its suspended particles 160 deep into the pores 114 and 116, under the influences of both the momentum of application generally normal to the outer surface 112 of the metal body 110 and capillary attraction within the pores 114 and 116. (2) The particles 160 are more dense than the liquid medium, preferably having a sprcific gravity of at least about four times that of the liquid medium, so that during the aforesaid application of the liquid medium, as illustrated in FIG. 6, when the liquid medium is slowed down by constrictions deep within the pores inertia of the heavier particles 160 will tend to keep them moving inwardly relative to the liquid medium so that the particles 160 will accumulate proximate such constrictions and thereby commence plugging and sealing off the small inner channel portions or fissures of the pores beyond the constrictions, and so that such accumulation of the particles and sealing off of the small inner channel portions or fissures can be continued by the forceful impacting and impelling of the particulate material 160 inwardly relative to the liquid medium during the outer surface treating and particle impelling step illustrated in FIG. 7. (3) The particulate material 160 is substantially insoluble in the liquid medium so that after the accumulating particles have become wedged in the pore constrictions so as to plug and seal off the small inner channel portions of the pores and any air that may have become entrapped therein, they will remain in solid form in such plugging positions both prior to the application of the outer coating, which is the condition illustrated in FIG. 8, and during and after the application of the outer coating over a long working life of the coated metal structure as illustrated in FIG. 9.

With oil as the liquid medium of the modified inner protective or sealing material product, the preferred particulate material 160 is a pigment of the type adapted for use in oil base paint, or a combination of such pigments. Many of such pigments have all three of the above designated characteristics for the particulate material 160. Thus, almost all such pigments have extremely small particle sizes such that the particulate material will remain substantially uniformly dispersed in suspension in the oil for a reasonable length of time for application of the oil and suspended particulate material as illustrated in FIG. 6, and such that the pigment particles are much smaller than the main outer portions 114*a* and 116*a* of the respective pores 114 and 116. Most of such pigments consist of particles that are several times as dense as the oil liquid medium, and approximately half of such pigments consist of particles having a specific gravity at least approximately four times that of the liquid medium oil. Essentially all of such pigments consist of particles that are substantially insoluble in the liquid medium oil, even over a time period of many years.

Another desirable characteristic of such pigments for use as the particulate material 160 suspended in the liquid medium oil for the present invention is that practically all of them are chemically very inactive, being fully oxidized, so that their use in the present invention does not introduce any corrosive agents into the bodies 130 of inner protective or sealing material.

The configurations of the individual particles of such pigments are, in most cases, satisfactory for the clustering or aggregation of the particles in pore constrictions so as to plug and seal off small inner channel portions of the pores, or possibly in some instances for the plugging and sealing off of the smallest of the inner channel portions of the pores by individual particles. Thus, typically, such pigment particles are described as "very fine crystals", "very fine crystal aggregates", "very fine crystal grains", "minute round grains", "fine composite grains", "fine prismatic grains", "round grains", "spherical grains", and the like.

Figure 7:
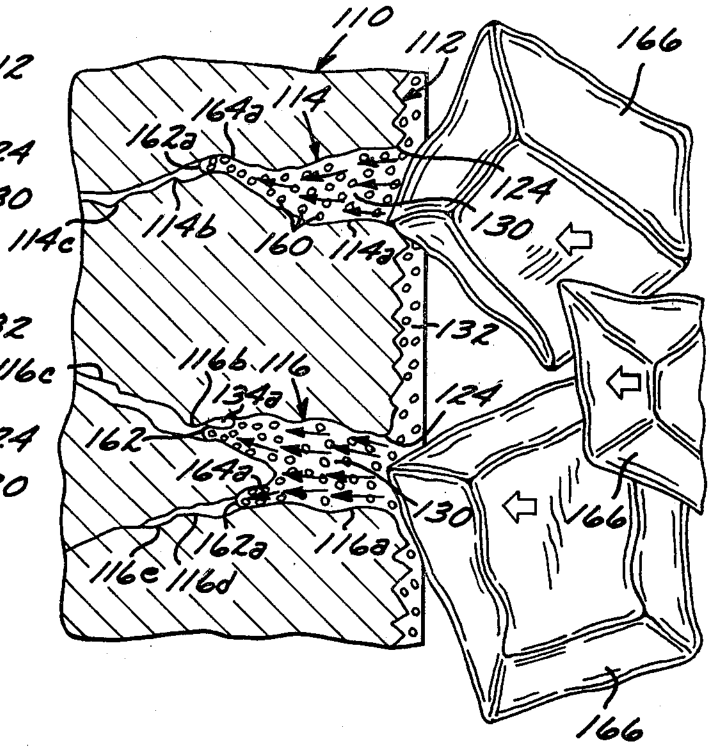
FIG. 7 is a view similar to FIG. 6, diagrammatically illustrating the particle-blasting step that is applied after the pore impregnation step illustrated in FIG. 6, and particularly illustrating the manner in which some of the finely divided particulate material that is suspended in the inner protective or sealing material such as oil is driven inwardly through the pores to complete the plugging or stoppering of small inner channels of the pores.

The proportion of finely divided particulate material 160 in the liquid medium is chosen so that there is a sufficient quantity of the particulate material 160 for particles thereof to readily accumulate proximate pore constrictions and thereby plug and seal off small inner channel portions of the pores beyond such constrictions, during the method steps illustrated in FIGS. 6 and 7, or possibly in some instances for individual particles of the particulate material 160 to seal off the smallest of the inner channel portions of the pores. However, the proportion of the particulate material 160 in the liquid medium is preferably not sufficient to add materially to the viscosity of the liquid medium and hence materially reduce the penetrability of the liquid medium into the pores 114 and 116. By way of example only, and not of limitation, where oil has been used as the liquid medium and oil base paint pigment used as the finely divided particulate material 160, proportions in the range of from about 1/100th to about 1/25th of pigment to oil by volume have been found to be satisfactory.

Figure 8:
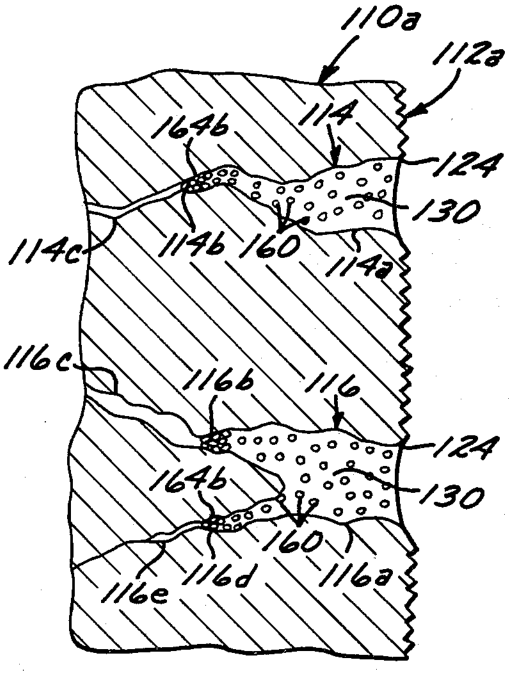
FIG. 8 is a view similar to FIGS. 6 and 7, at the same stage of the process as illustrated in FIG. 4, after the particle-blasting shown in FIG. 7 has completed the preparation of the outer surface of the metal body for the application of the outer coating, and has completed the plugging and sealing-off of the small inner channels of the pores.
Figure 9:
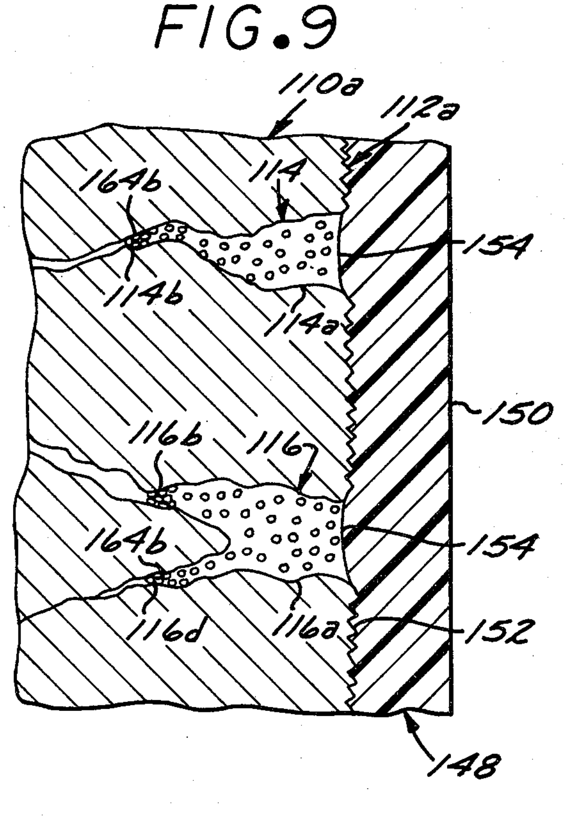
FIG. 9 is a view similar to FIGS. 6–8, at the same stage of the process as illustrated in FIG. 5, illustrating the completed protected metal body, with the small inner channels of the pores and any air and accompanying corrosives effectively isolated from the interface between the surface of the metal and the outer coating at the pore orifices.

Referring to FIGS. 6–9, it is to be noted that any of a number of different constricting locations could be designated as "constrictions" in either of the pores 114 and 116. However, the particular pore constriction 114*b* of pore 114 and constrictions 116*b* and 116*d* of pore 116 have been designated because they are locations in the pores proximate which the particles accumulate and wedge into plugs or stoppers as shown in FIG. 8.

Referring again to FIG. 6, after the particulated liquid medium has been applied, but before the next step of FIG. 7 has been applied, the inward propelling force of the application, as well as inward capillary attraction, will cause the inner ends of the bodies of the particulated liquid medium to reach positions designated 162 in the pores 114 and 116 which are considerably outwardly spaced from the constriction 114*b* of pore 114 and the constrictions 116*b* and 116*d* of the pore 116. FIG. 6 also illustrates an initial clustering or aggregating of the finely divided particulate material 160 adjacent these inner ends 162 of bodies 130. This inward clustering or aggregating of the particulate material 160 is caused by the fact that the particles 160 have greater momentum than the liquid medium they displace because of their greater specific gravity, so that when the inwardly directed movement of the particulated medium is slowed down and finally stopped in the progressively constricting pores 114 and 116, the particles 160 tend to continue moving inwardly relative to the liquid medium. These accumulating clusters or aggregations of particles 160 proximate the inner ends 162 of bodies 130 are generally designated 164 in FIG. 6.

By way of example, an air bubble 134, which may contain corrosive agents, is shown entrapped in the particulated liquid medium in the pore 116, the air bubble 134 being too deep in the body 130 to be agitated out of the pore orifice 124 in the succeeding method step illustrated in FIG. 7. Nevertheless, as is illustrated in FIG. 7, the filtering capability of the cluster of particulate material 160 that is forming inwardly of the bubble 134 will allow the bubble 134 to be bled out of the body 130 on into the small inner channel portion 116c of the pore 116.

FIG. 7 illustrates the outer surface treating and particle impelling step, as such step is just commencing. Upon the completion of this outer surface treating and particle impelling step, the metal body 110 is in its condition designated 110a in FIG. 8 in which it is fully prepared to receive the outer coating. The outer surface treating and particle impelling step illustrated in FIG. 7 is applied by particle-blasting the outer surface 112 of metal body 110 with a multiplicity of particles 166 that are directed generally normal to the general plane of the outer surface 112. This particle-blasting to accomplish the outer surface treating and particle impelling step of FIG. 7 is applied in the same manner as the particle-blasting of the outer surface treating step described in detail hereinabove in connection with FIG. 4, with all of the effects described in connection with FIG. 4, and with the additional effect of forcefully impacting and impelling particles of the suspended particulate material 160 inwardly through the bodies 130 of inner protective or sealing material so as to complete the wedging of clusters of the particles 160, or possibly individual particles 160 in some instances, in the pore constrictions so as to complete the plugging or stoppering of the small inner channel portions of the pores.

Thus, the individual particles 166 employed in the particle-blasting step illustrated in FIG. 7 are larger than pore orifices 124 so that the particles 166 will not enter the pores and displace the bodies 130 of inner protective or sealing material therefrom to any material extent, but will impinge upon and remove the outer film 132 of inner protective or sealing material from the entire exposed outer surface 112 of the metal body. Preferably, the particles 166 employed in the particle-blasting are of a material such as natural or artificial sand wherein the individual particles 166 have points or corners so that the outer surface 112 of the metal body 110 will not only be thoroughly cleaned, but it will constitute a new surface 112a as shown in FIG. 8 of irregular, roughened, generally toothed texture that provides an enlarged area for intimate bonding of the outer covering material. No. 3 natural or artificial sand has been found to be satisfactory for the outer surface treating and particle impelling step of the FIG. 7, as applied to steel and aluminum metal bodies 110, although it is to be understood that other grades or sizes of such particles may be employed, provided the particles 116 are not so small as to materially enter the pores such as pores 114 and 116 and thereby displace material amounts of the particulated inner protective or sealing material from the bodies 130 thereof in the pores, and provided the particles 166 are not so large as to cause extensive pitting of the outer surface of the metal body.

During the particle-blasting step of FIG. 7, the individual particles 166 are propelled at high velocity in the direction generally normal to the surface 112 of metal body 110, the particles 166 not only completely removing all inner protective or sealing material from the surface 112 and providing a new, mechanically etched outer surface 112a as seen in FIG. 8, but also impacting against many of the finely divided particles 160 proximate the pore orifices 124 as illustrated in FIG. 7. This causes a considerable amount of the inwardly directed kinetic energy of the blasting particles 166 to be transferred to the finely divided particulate material 160 within the bodies 130 of inner protective or sealing material. Some of those finely divided particles 160 that are directly impacted by the large blasting particles 166 may be driven all of the way inwardly through the main outer portions 114a and 116a of the respective pores 114 and 116, while others of the directly impacted finely divided particles 160 will impact against additional finely divided particles 160 in a domino-like sequence. Since the finely divided particles 160 are more dense than the liquid medium they displace, their inwardly directed momentum which results from repeated impacts by the larger blasting particles 166 causes a continuing accumulation and clustering of the particles 160 in the pore constrictions as the particle-blasting step of FIG. 7 proceeds. Thus, as at an early stage in the particle-blasting illustrated in FIG. 7, the inner ends 162a of the bodies 130 of inner protective or sealing material have moved further inwardly from the position 162 of FIG. 6, but have not moved all of the way inwardly to the constriction points 114b of pore 114 and 116b and 116d of pore 116. During the course of the particle-blasting of FIG. 7 the clustering particles, now designated 164a, are becoming more compacted and are commencing to wedge together. Additionally, the bubble 134 shown in FIG. 6 has, at the stage of the particle-blasting shown in FIG. 7, partly filtered inwardly through the aggregating particulate material 160, so that the bubble, now designated 134a, has been greatly diminished in size.

FIG. 8 illustrates the metal body 110a after completion of the outer surface treating and particle impelling step illustrated in FIG. 7. The clusters of finely divided particulate material 160 have now become fully compacted and wedged together in the form of particle plugs or stoppers designated 164b which define the inner ends of bodies 130 of inner protective or sealing material. These particle plugs or stoppers 164b have, during the final stages of the particle-blasting of FIG. 7, been moved further inwardly to positions proximate the constriction 114b in pore 114 and the constrictions 116b and 116d in pore 116. Also during the final stages of the particle-blasting of FIG. 7, the remainder of the diminished bubble 134a has passed inwardly through the accumulating cluster of particles 160 into the small inner channel portion 116c of pore 116. While clusters or groups of the finely divided particles will normally make up the particle plugs or stoppers 164b, it is to be understood that in the case of some of the smallest of the inner channel portions of the pores single particles 160 may be of sufficient dimension to constitute the particle plugs or stoppers 164b.

During the particle-blasting step illustrated in FIG. 7, when the small inner channel portions 114c of pore 114 and 116c and 116e of pore 116 have become fully plugged or stoppered, further inward movement of the bodies 130 under the influence of the impacting blasting particles 166 is prevented. Similarly, further inward travel of the bodies 130 of inner protective or sealing material under the influence of capillary action is blocked. The result is that inward dishing or cupping of the surfaces 146 of bodies 130 of inner protective or sealing material is minimized, and tends to be less than when the invention is practiced with an unparticulated inner protective or sealing material as illustrated in FIGS. 4 and 5 of the drawings. Such minimization of dishing or cupping of the particulated liquid medium surfaces 146 proximate pore orifices 124 eliminates the possibility of entrapment of air immediately underneath the outer covering, and thus assures against the presence of any atmospheric corrosives at the critical interface between the outer surface 112*a* of metal body 110*a* and the outer coating at the pore orifices 124.

Despite the lessened or minimized dishing or cupping of the liquid surfaces 146, with the use of the particulated liquid medium as the inner protective or sealing material there is less tendency for the liquid medium to leak out of the pores onto the outer surface, because sealing off of the small inner channel portion 114*c* of pore 114 and the small inner channel portions 116*c* and 116*e* of pore 116 by means of the particle plugs or stoppers 164*b* maintains the effectiveness of atmospheric pressure on the surfaces 146 of the particulated liquid medium proximate the pore orifices. By this means the use of the particulated liquid medium as the inner protective or sealing material provides an extended interval of time after the outer surface treating and particle impelling step of FIG. 7 during which the outer covering may be applied as in FIG. 9 without its bonding to the outer surface being adversely affected by the presence of any of the particulated liquid medium on the outer surface 112*a*.

The wedged particle plugs or stoppers 164*b* of the finely divided particles 160 also serve to completely isolate air that may be entrapped in the small inner channel portions or fissures 114*c* of pore 114 and 116*c* and 116*e* of pore 116, and prevent any such air from shifting outwardly as bubbles into the main outer portions 114*a* and 116*a* of respective pores 114 and 116 after the outer coating has been applied as in FIG. 9, and over a long operational life of the metal body 110*a*. Without the presence of the particle plugs or stoppers 164*b*, mechanical working of the metal body 110*a* and thermal cycling of the metal body 110*a* could possibly have caused entrapped air to shift outwardly, as bubbles, through the liquid bodies 130 and to the critical metal surface-outer coating interface at pore orifices 124.

Referring now to FIG. 9, the final process step for producing the modified form of the invention shown in FIGS. 6–9 is application of uninterrupted covering 148 of outer protective or sealing material which directly interfaces with both the outer metal body surface 112*a* and the surfaces 146 of the bodies 130 of inner protective or sealing material, but which adheres and bonds only to the outer metal surface 112*a* when an inner protective material liquid medium such as oil is employed, the covering 148 being wetted by, but not bonded or adhered to, the inner protective or sealing material at the surfaces 146 thereof. The covering 148 of outer protective or sealing material is applied before any material extent of leakage of the bodies 130 of inner protective or sealing material can occur out of the pores 114 and 116 onto the outer surface 112*a*. The covering 148 of outer protective or sealing material preferably has a generally smooth outer surface 150. The covering 148 has a direct interface 152 with the entire outer surface 112*a* in the form of an intimate bond therebetween, and the covering 148 bridges over and encapsulates the bodies 130 of inner protective or sealing material, having direct interfaces 154 with such bodies 130 of inner protective or sealing material.

The liquid medium in the bodies 130 of inner protective or sealing material in the form of the invention illustrated in FIGS. 6–9 is selected to have all of the same characteristics as described hereinabove in detail for the inner protective or sealing material bodies 30 in the form of the invention shown in FIGS. 1–5. Similarly, the outer protective or sealing material in the covering 148 in the form of the invention shown in FIGS. 6–9 is selected to have all of the same characteristics as the outer protective or sealing material in the covering 48 as described in detail hereinabove for the form of the invention shown in FIGS. 1–5 of the drawings.

The process used to produce the structure of the present invention has been disclosed in connection with the use of certain liquid media for the inner protective or sealing material bodies 30 and 130, i.e., "3-In-1" brand oil and 30 weight motor oil, and the use of certain metals, i.e., aluminum and steel. It will be evident from the above discussion, however, that the process is not dependent upon the use of such specific materials, except that the features and advantages of the present invention are best achieved through the matching of the characteristics of the liquid medium of the inner protective or sealing material such as oil and the metal. Furthermore, it will be apparent that the present invention is not limited to the particular outer protective or covering materials discussed above and that any suitable coverings 48 and 148 of outer protective or sealing material may be utilized provided that it is impenetrable or impermeable by external corrosive agents and also by the liquid medium of the inner protective or sealing material, and is not materially combinable or miscible with the liquid medium of the inner protective or sealing material, and provided further that the outer protective or sealing material exhibits satisfactory intimate bonding characteristics with the prepared outer metal surface. Accordingly, the structure of the present invention must be broadly construed and the selection of particular inner and outer protective or sealing materials can be easily carried out and parameters determined by those skilled in the art.

Accordingly, the present invention is not limited by the specific exemplification above, but must be construed as broadly as any and all equivalents thereof.

I claim:

1. Corrosion protection structure for a metal body having outer surface means and pore means comunicating with said outer surface means, which pore means comprises at least some small inner channel portions, which portions may contain air bubbles, said structure comprising:

inner protective material disposed within said pore means, said inner material comprising a liquid medium that is substantially impervious to atmospheric corrosive agents and a suspension of finely divided particulate material in said liquid medium, said outer surface means being substantially free of said inner material, and outer protective material which is different from said liquid medium and is in solid state that is substantially impervious to atmospheric corrosive agents and to said liquid medium forming a covering over said outer surface means and said pore means, said covering being intimately bonded to said outer surface means and bridging over said pore means, said inner material extending across outer portions of said pore means proximate the region where said pore means communicates with said outer surface means, and some of said particulate material substantially sealing off small inner channel portions of said pore means so as to stabilize the location of said inner material proximate said region by preventing inward flow of liquid medium into the inner channel portions and providing a barrier to outward movement of any air bubbles that may be entrapped in the inner channel portions.

2. Corrosion protection structure as defined in claim 1, wherein the particles of said particulate material are much smaller than said outer portions of said pore means.

3. Corrosion protection structure as defined in claim 1, wherein the particles of said particulate material are more dense than said liquid medium.

4. Corrosion protection structure as defined in claim 1, wherein the particles of said particulate material have a specific gravity of at least about four times that of said liquid medium.

5. Corrosion protection structure as defined in claim 1, wherein the particles of said particulate material are substantially insoluble in said liquid medium.

6. Corrosion protection structure as defined in claim 5, wherein the particles of said particulate material are much smaller than said outer portions of said pore means and are more dense than said liquid medium.

7. Corrosion protection structure as defined in claim 1, wherein said liquid medium comprises oil.

8. Corrosion protection structure as defined in claim 1, wherein said particulate material comprises pigment.

9. Corrosion protection structure as defined in claim 1, wherein said liquid medium comprises oil and said particulate material comprises paint pigment.

10. Corrosion protection structure as defined in claim 1, wherein said particulate material is substantially fully oxidized and therefore generally chemically inactive.

11. Corrosion protection structure as defined in claim 1, wherein the proportion of said particulate material in said liquid medium is sufficient for particles thereof to readily accumulate proximate constrictions leading to said small inner channel portions of said pore means, while not being sufficient to add materially to the viscosity of said liquid medium.

12. Corrosion protection structure as defined in claim 1, wherein said liquid medium comprises oil and said particulate material comprises paint pigment, said oil and pigment being in proportions of from about 1/100th to about 1/25th by volume of pigment to oil.

13. Corrosion protection structure as defined in claim 1, wherein said outer material is substantially impervious to marine corrosive agents.

14. Corrosion protection structure as defined in claim 1, wherein said metal body comprises steel.

15. Corrosion protection structure as defined in claim 14, wherein said liquid medium comprises oil.

16. Corrosion protection structure as defined in claim 1, wherein said metal body comprises aluminum.

17. Corrosion protection structure as defined in claim 16, wherein said liquid medium comprises oil.

18. Corrosion protection structure as defined in claim 1, wherein clusters of particles of said particulate material substantially seal off said small inner channel portions of said pore means.

19. Corrosion protection structure as defined in claim 1, wherein said outer material comprises resin.

20. Corrosion protection structure as defined in claim 19, wherein said resin in reinforced with filler material.

21. Corrosion protection structure as defined in claim 19, wherein said liquid medium comprises oil.

22. Corrosion protection structure as defined in claim 21, wherein said particulate material comprises paint pigment.

* * * * *